(12) United States Patent
Eisenhardt

(10) Patent No.: US 7,407,460 B2
(45) Date of Patent: Aug. 5, 2008

(54) PLANETARY GEARBOX

(75) Inventor: Armin Eisenhardt, Bisingen (DE)

(73) Assignee: A & M Electric Tools GmbH, Winnenden (DE)

( * ) Notice: Subject to any disclaimer, the term of this patent is extended or adjusted under 35 U.S.C. 154(b) by 169 days.

(21) Appl. No.: 11/162,799

(22) Filed: Sep. 23, 2005

(65) Prior Publication Data
US 2006/0068968 A1    Mar. 30, 2006

(30) Foreign Application Priority Data
Sep. 25, 2004    (DE)    .................. 20 2004 014 986 U

(51) Int. Cl.
F16H 3/44    (2006.01)
F16H 3/78    (2006.01)
(52) U.S. Cl. .................. 475/303; 475/298; 173/216
(58) Field of Classification Search .................. 475/299, 475/303, 298, 320; 173/216, 48, 104
See application file for complete search history.

(56) References Cited

U.S. PATENT DOCUMENTS 4,821,591 A * 4/1989 Adler .......................... 74/339

6,572,506 B2 * 6/2003 Williams et al. ............ 475/204

FOREIGN PATENT DOCUMENTS

DE    42 13 291    10/1993

* cited by examiner

Primary Examiner—Charles A Marmor
Assistant Examiner—Derek D Knight
(74) Attorney, Agent, or Firm—Gudrun E. Huckett

(57) ABSTRACT

A planetary gearbox for a power tool has a planetary carrier and a rotatable sleeve with sun wheel toothing arranged centrally on the planetary carrier. The sleeve has a radial section with outer toothing. Planet wheels are positioned between planetary carrier and radial section and mesh with the sun wheel toothing. A switching ring gear surrounds the planet wheels and has an inner toothing meshing with the planet wheels. The switching ring gear is axilaly moveable on the planet wheels between first and second end positions for switching a transmission ratio. In the second end position the switching ring gear engages the outer toothing of the radial section. A synchronization disk, rotating with the rotary sleeve, is positioned between planet wheels and radial section and acts directly or indirectly by friction on the switching ring gear when the latter is moved from the first into the second end position.

11 Claims, 3 Drawing Sheets

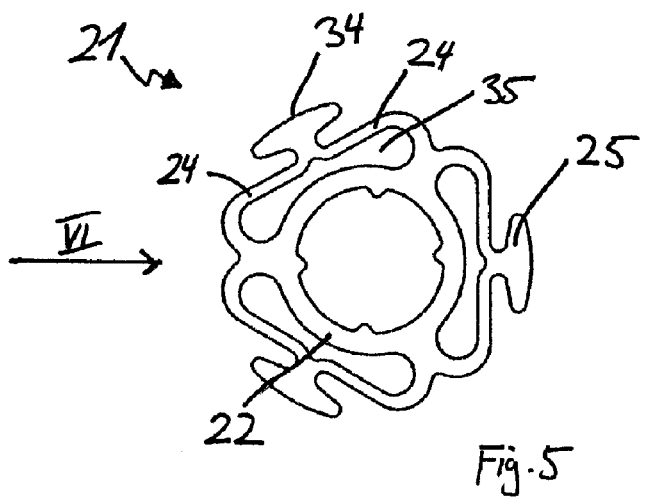
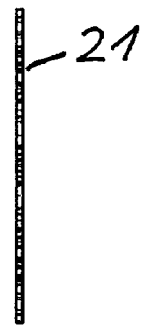
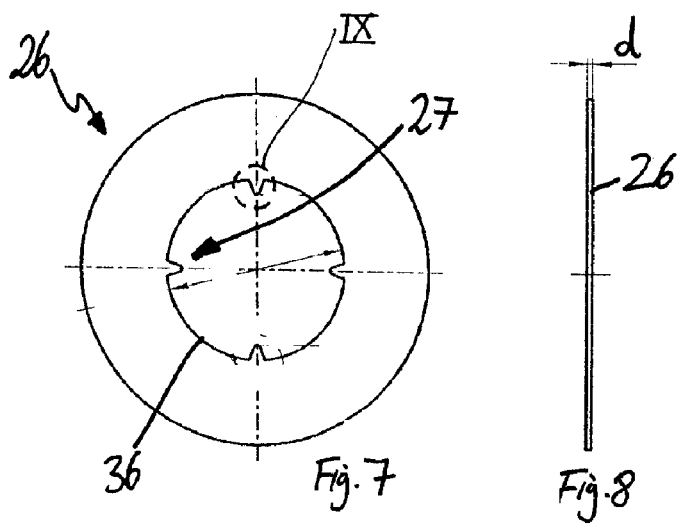
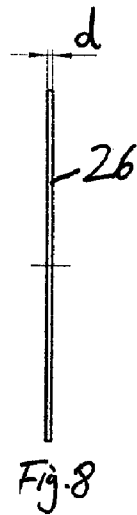
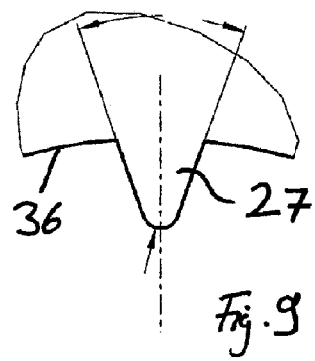
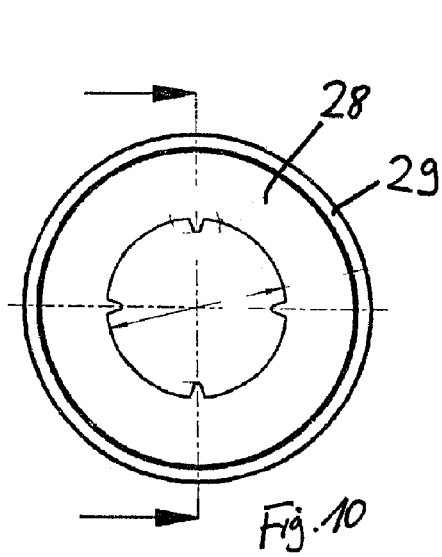
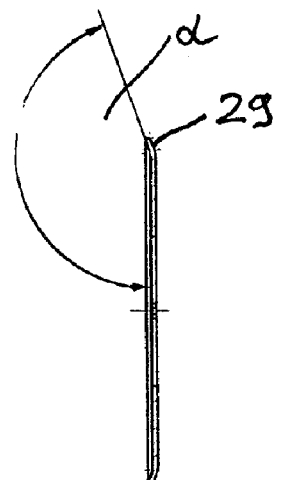

PLANETARY GEARBOX

BACKGROUND OF THE INVENTION

The invention relates to a switchable planetary gearbox, in particular, for a hand-held power tool, comprising a planetary carrier supporting on one end face several planet wheels whose toothing meshes permanently with a sun wheel toothing of a central rotary sleeve. The planetary gearbox further comprises a switching ring gear surrounding the planet wheels and meshing permanently with the toothing of the planet wheels. The switching ring gear is longitudinally slidable and, for switching a transmission stage of the planetary gearbox, can be moved into engagement with an outer circumferential toothing that is provided on the circumference of a radial section of the rotary sleeve covering the end face of the planet wheels facing away from the planetary carrier.

As is known in the art, planetary gearboxes are comprised essentially of a central sun wheel on which the planet wheels supported on a planetary carrier are rolling. Usually three planet gear wheels are supported externally on the concentrically arranged ring gear. Such a gearbox is suitable, in particular, for use in hand-head working tools such as power drills because the configuration of the planetary gearbox provides a favorable ratio between size and transmittable power for a relatively high possible transmission ratio.

German patent DE 42 13 291 C2 discloses a planetary gearbox for a hand-held hammer drill wherein the gearbox acts by means of a crown gear onto the drive spindle of the drill. In order to be able to shift into the different gears of the hammer drill, the planetary gear is provided with different transmission stages wherein shifting between the stages is realized by means of an axially movable switching ring gear moveable into several displacement positions. One of the transmission stages of the gearbox corresponds to a position of the switching ring gear in which the switching ring gear is blocked by a locking member that is provided on the housing of the gearbox and engages the toothing of the switching ring gear for blocking. By axial movement of the partial switching ring gear by means of a gear shifting grip, the transmission stage can be switched in that the toothing of the switching ring gear is moved into engagement with the outer toothing of a gear member that covers the planet wheels radially. In the known planetary gearbox, the radial section supporting the outer toothing is provided on the central sleeve that supports the sun wheel toothing or is kinematically coupled therewith.

On the planetary gearbox of the power tools, usually an increased wear is observed during operation of the power tool and this wear is worsened even more by repeated shifting during operation when idling or operating under load. Particularly the inner toothing of the switching ring gear and the outer toothing of the web that is to switched or blocked are subject to the wear effects.

SUMMARY OF THE INVENTION

It is an object of the present invention to further develop the gearbox of the aforementioned kind such that the wear effects are counteracted and the service life of the gearbox is increased.

In accordance with the present invention, this is achieved in that between the planet wheels and the radial section of the sleeve supporting the outer toothing a synchronization disk is arranged such on the sleeve that it is entrained by the sleeve and in that, upon movement of the switching ring gear in the direction toward the outer toothing, the synchronization disk acts frictionally directly or indirectly on the switching ring gear.

The invention is based on the finding that the increased wear effects occurring upon increased switching processes between the transmission stages are caused by the high speed differences between the switching ring gear and the component supporting the outer toothing. With the configuration according to the invention comprising a synchronization disk entrained by the central sleeve, the switching ring gear when approach the outer toothing is accelerated by the synchronization disk and is synchronized to the speed of the sleeve and thus of the outer toothing. Because the switching ring gear during the switching or shifting process is pushed across the synchronization disk, either the outer circumference of the synchronization disk contacts the inner toothing of the switching ring gear and acts therefore frictionally on the inner toothing of the switching ring gear or the synchronization disk acts frictionally on the planet wheels and through them indirectly onto the switching ring gear. A satisfactory frictional connection between the synchronization disk and the switching ring gear without impairment of the longitudinal (axial) movement of the switching ring gear is achieved expediently by providing the synchronization disk with a diameter that matches approximately the tip circle of the toothing of the switching ring gear. It was found to be especially advantageous when the synchronization disk has a diameter that is minimally oversized relative to the tip circle of the inner toothing of the switching ring gear.

In a simple and compact configuration a positive-locking drive of the synchronization disk can be realized through the sun wheel toothing of the sleeve when the synchronization disk is provided at its inner circumference with at least one radial nose switching that in the mounted position of the synchronization disk engages the sun wheel toothing of the sleeve. Expediently, there are several radial noses on the inner circumference of the synchronization disk arranged at a rotary angle spacing in accordance with the pitch of the sun wheel toothing so that a strong positive-locking drive action is realized while a uniform force introduction into the synchronization disk is realized.

In order to improve friction engagement of the synchronization disk on the switching ring gear, the synchronization disk can be provided on its circumference with an angled edge so that a damaging effect of the fast-rotating toothing of the switching ring gear onto the edge of the synchronization disk can be counteracted in this way.

The synchronization disk is particularly resistant in regard to wear effects caused by the action of the ring gear toothing when its outer circumference is formed by several radially displaceable contact sections. As soon as the switching ring gear has been pushed across the synchronization disk, the contact sections resting against the inner toothing of the switching ring gear are displaced and in this way protected against damaging effects or destruction. It is particularly advantageous when the contact sections are configured as contact jaws that are arranged on deflectable spring arms. Such an advantageous configuration of the synchronization disk according to the invention can be realized by providing appropriate cutouts in the synchronization disk by simple means, for example, by stamping, wherein the contact jaws, the spring arms, and a central ring for slipping the disk onto the sleeve form a monolithic component.

In an advantageous configuration of the invention, the synchronization disk is arranged in a gap between the planet wheels and a planetary carrier of another planetary gear stage;

this provides a multi-stage planetary gearbox with synchronized shifting action of a very compact configuration.

BRIEF DESCRIPTION OF THE DRAWING

FIG. 5 is first embodiment of a synchronization disk in axial view.
FIG. 6 is a side view of the synchronization disk of FIG. 5 viewed in a direction of arrow VI.
FIG. 7 is an alternative configuration of a synchronization disk in axial view.
FIG. 8 is a side view of the synchronization disk according to FIG. 7.
FIG. 9 is a detail view of the detail IX a FIG. 7.
FIG. 10 is a another embodiment of a synchronization disk.
FIG. 11 is a cross-section of the synchronization disk according to FIG. 10.

DESCRIPTION OF THE PREFERRED EMBODIMENTS

Figure 1:
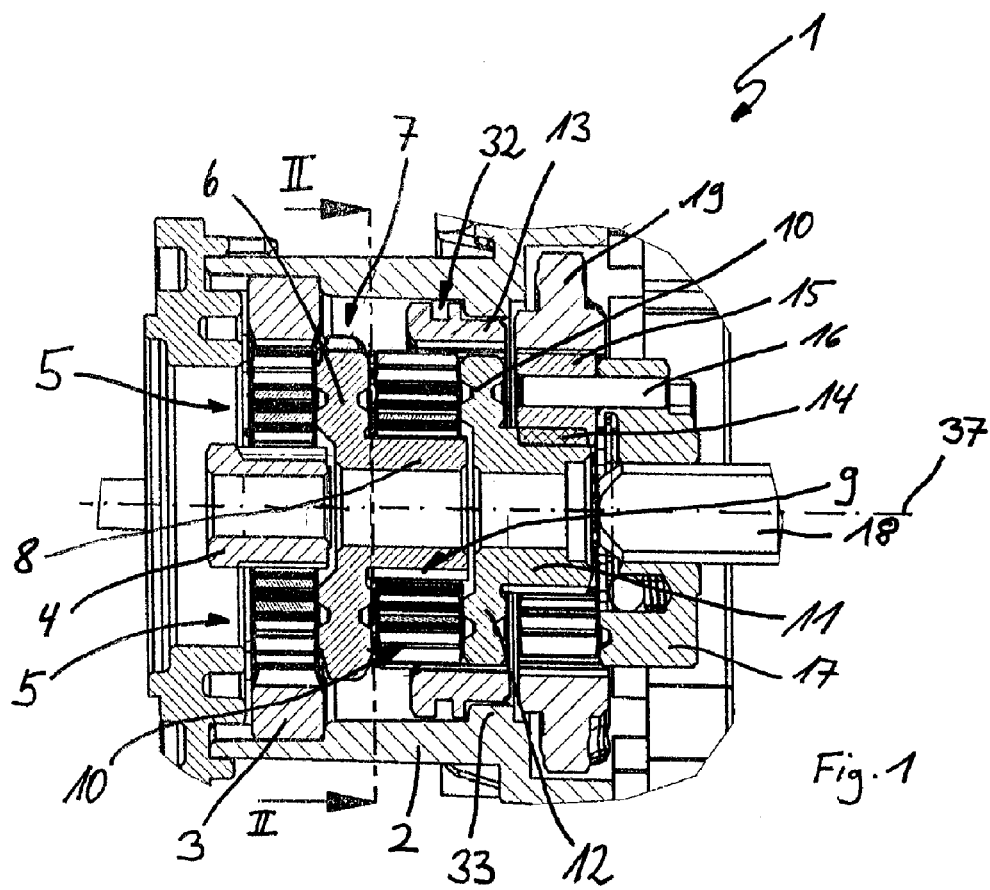
FIG. 1 is a longitudinal section of a planetary gearbox.

In the following description same parts are identified by same reference numerals.

FIG. 1 shows a cross-section of a planetary gearbox 1 for a power tool, not illustrated, such as a power drill or the like, that is arranged between the drive motor of the power tool and its working spindle. The planetary gearbox 1 has in its housing 2 several gear stages that can be combined in different ways by a shifting device to be described in the following and, depending on the shifted position, transmit the speed of the motor at different transmission ratios onto the drive spindle and the tool of the power tool. The three gear stages are each designed as planetary gears and thus provide a favorable ratio between minimal size and transmittable power. The speed and the torque of the drive motor are introduced by a drive sleeve 4 into the gearbox 1 wherein the drive sleeve 4 is a central sun wheel of the first transmission stage. First planet wheels 5 are rolling on the sun wheel toothing of the drive sleeve 4 and are rotatably guided on a planetary carrier. The first planet wheels are supported on the toothing of a first ring gear 3 that is supported in the housing 2 in the illustrated embodiment.

The speed of the planetary carrier 6 of the first planet wheels 5 provides the input speed for the axially neighboring second transmission stage. In this connection, the planetary carrier 6 of the first planet wheels 5 is fixedly connected to a second sleeve 8 that is coaxially positioned relative to the drive sleeve 4; the sleeve 8 is provided on its circumference with a sun wheel toothing 9 and forms the sun wheel of the second planetary gear stage. In the present embodiment, the first planetary carrier 6 that is embodied essentially radially to the axis of rotation if the gearbox 1 and the sun wheel sleeve 8 of the second gear stage that is configured primarily axially form together a monolithic part. On the sun wheel toothing 9 of the central sleeve 8 of the second gear stage the second planet wheels 10 are rolling and are supported on the second planetary carrier 12. The second planetary carrier 12 and the sun wheel sleeve 11 of the third planetary gear stage together form a monolithic part. Third planet wheels 15 mesh with the sun wheel sleeve 11. The third planet wheels 15 are supported on the toothing of a third ring gear 19 and are supported by means of bolts 16 rotatably on the planetary carrier 17. By rotary movement of the planetary carrier 17 that is created by the rolling action of the third planet wheels 15 on the sun wheel toothing 14 is transmitted as output speed of the gearbox 1 onto the output shaft 18.

Figure 3:
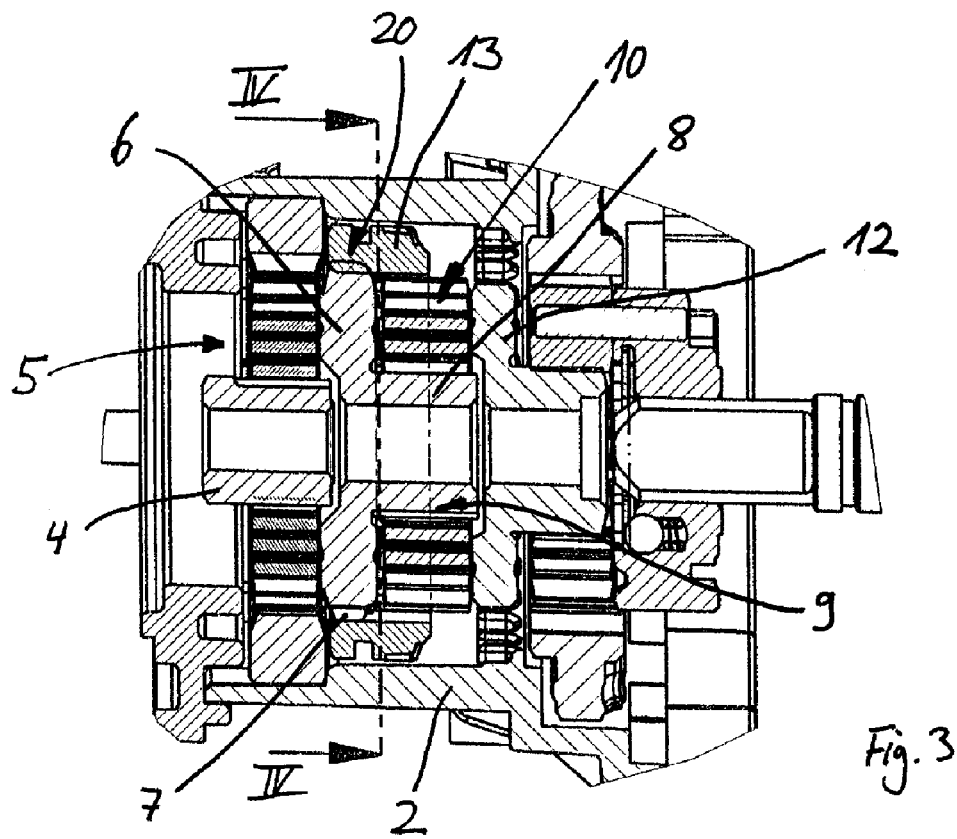
FIG. 3 is a longitudinal section of the planetary gearbox in a second transmission position.

The switching ring gear 13 of the second gear stage, whose inner toothing meshes constantly with the three planet wheels 10 of the second gear stage, is arranged to be longitudinally (axially) slidable. By movement of the switching ring gear 13 shifting of the transmission ratio can be realized. The switching ring gear 13 is provided at its circumference with a circumferential groove 32 that is engaged by a gearshift lever, not illustrated. The switching ring gear 13 is thus movable in the axial direction of the main axis of rotation 37 of the gearbox 1 within a space in which in the axial direction the first planetary carrier 6 and the second planetary carrier 12 as well as the planet wheels 10 supported on the second planetary carrier 12 are arranged. In the end position illustrated in FIG. 1 the switching ring gear 13 is movable into the switching position illustrated in FIG. 3 in which the inner toothing 20 of the switching ring gear 13 is in engagement with an outer toothing 7 that is provided on the circumference of the radially extending first planetary carrier 6. The configuration of the gearbox 1 corresponds in other respects to the illustration of FIG. 1 and the corresponding description. The outer circumferential toothing 7, as a result of the monolithic configuration of the first planetary carrier 6 with the sun wheel 8 of the second gear stage, is fixedly coupled to the rotation of the sun wheel toothing 9. When the switching ring gear 13 is moved into the engagement position with the outer toothing 7 as illustrated in FIG. 3, the speed of the switching ring gear 13 is increased and the transmission ratio of the second gear stage is changed. When shifting down the transmission ratio of the gearbox 1, the inner circumferential toothing 20 of the movable switching ring gear 13 is disengaged from the outer toothing 7 of the planetary carrier 6 and, by reducing the speed, is moved into the end position of FIG. 1.

In the gap between the radial planetary carrier 6 of the first gear stage and the exposed end faces of the second planet wheels 10, a synchronization disk is arranged that can be entrained by the sun wheel sleeve 8 of the second transmission stage; the synchronization disk extends radially into the area of the outer toothing 7. The radial synchronization disk is positioned in the section plane II-II of FIG. 1 and IV-IV of FIG. 3. As can be seen in the cross-sectional illustrations of FIGS. 2 and 4, the synchronization disk 21 projects radially with its outer circumference into the area of the outer circumferential toothing 7 and is contacted in the corresponding position of the switching ring gear 13 by the inner toothing 20 of the switching ring gear 13. When the switching ring gear 13 is to be brought by a shifting action into engagement with the outer toothing 7, the inner toothing 20 of the switching ring gear 13 must contact the outer circumference of the synchronization disk 21 and is thus accelerated by frictional forces. Since the synchronization disk 21 is entrained by the sun wheel toothing 9 of the rotary sleeve 8, the synchronization disk 21 rotates constantly at the speed of the outer toothing 7 that, as it is a monolithic part of the sleeve 8, synchronously rotates with the rotary sleeve 8. The frictional forces between the synchronization disk 21 and the inner toothing 20 brings the switching ring gear 13 up to the speed of the outer toothing 7. By synchronizing the switching ring gear 13 and the outer toothing 7 before engagement, the wear caused by high loads on the tooth flanks is prevented. The synchronization disk can be very thin, e.g., less than 2 mm, and preferably has a thickness of approximately 0.5 mm; therefore, the disk 21 takes up only little space and is insertable in a simple way when assembling the planetary gearbox.

In FIGS. 5 through 11 configurations of the synchronization disk are illustrated. The synchronization disks 21, 26, 28 have a wall thickness d of advantageously 0.5 mm and have an inner circumference 36 with which they can be placed onto the rotary sleeve 8 of the second gear stage. In order to ensure a positive-locking engagement of the synchronization disk 21, 26, 28, the inner circumference 36 is provided with radial noses 27 which in the mounted position of the synchronization disk engage the sun wheel toothing. Advantageously, several radial noses are provided that are arranged in accordance with the pitch of the sun wheel toothing at the appropriate rotary angle position. The radial noses 27 illustrated in detail in FIG. 9 have expediently a tooth contour that matches that of the sun wheel toothing 9.

An especially preferred configuration of the synchronization disk 21 according to the invention is illustrated in FIGS. 5 and 6. An optimal spring behavior of the outer circumference of the disk loaded by the ring gear toothing is achieved in that the contact sections 34 contacted by the toothing are formed on contact jaws 25 that are displaceably connected to spring arms 24. By recesses 35 in the synchronization disk 21, produced, for example, by stamping, two spring arms 24 are provided that converge at their center and support the contact jaws 25. The contact section 34 is thus protected against wear or even destruction by the toothing of the switching ring gear and, when contacted by the toothing, yields radially while the spring arms 24 exert a corresponding pressure forces onto the tooth tips of the switching ring gear toothing 20.

Figure 2:
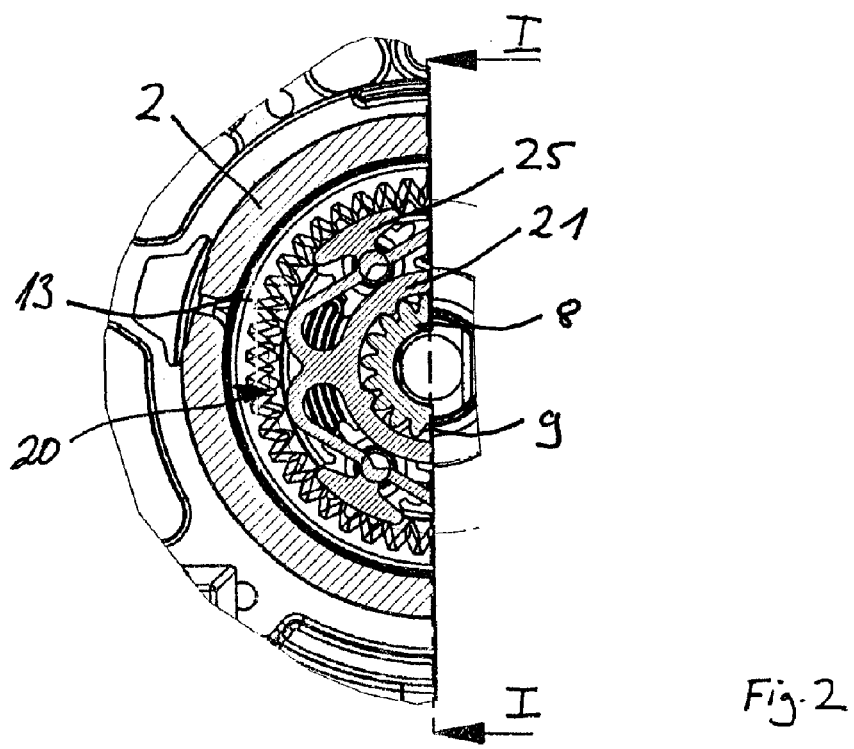
FIG. 2 is a cross-section along the line II-II of FIG. 1.
Figure 4:
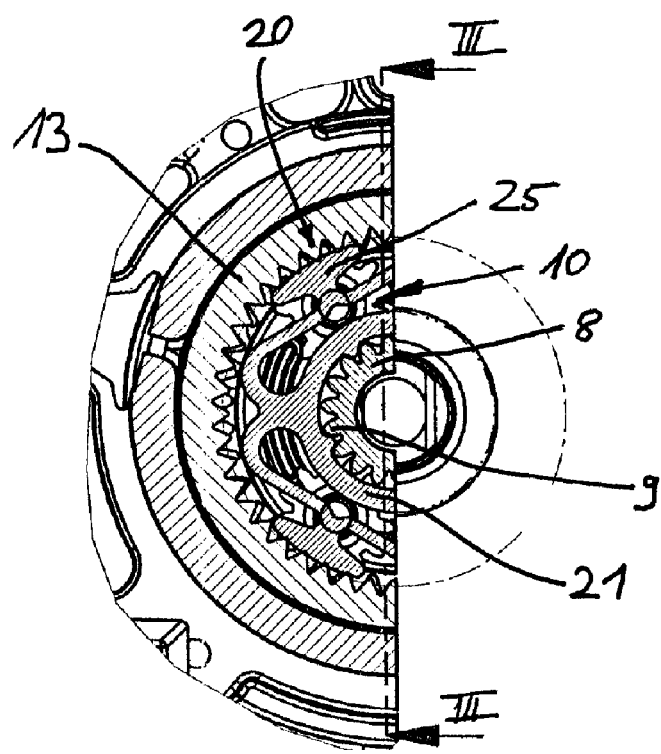
FIG. 4 is a cross-section of the planetary gearbox according to section line IV-IV of FIG. 3.

The base of the spring arms 24 are connected to the circumference of a central annular member 22 of the synchronization disk 21 with which the synchronization disk 21 by means of its radial noses is movable on the sun wheel toothing. The synchronization disk according to the invention is a monolithic part comprising the contact jaws 25, the spring arms 24 and the central securing ring 22 for a positive-locking entrainment by the rotary sleeve 8; it can be produced, for example, by stamping. In the present embodiment the synchronization disk 21 is provided with three radially displaceable contact jaws 25 that are distributed uniformly about the circumference of the synchronization disk 21. As can be seen in FIGS. 2 and 4, the synchronization disk 21 can be mounted advantageously in such a rotational position that the three content jaws 25 are positioned so as to overlap the end faces of the planet wheels 10 and in this way protect the bearing of the gear wheels.

The synchronization of the speed of the switching ring gear 13 can be realized directly, as realized, for example, by the synchronization disk 21 according to FIG. 5. In order to provide frictional connection between the synchronization disk 21 and the inner toothing 20 of the switching ring gear 13, the contact jaws 25 have a diameter that is matched such that the circumscribed circle of the rotational movement extends radially into the area of the outer toothing such that at least the tip circle of the toothing 20 of the switching ring gear 13 is reached. The tip circle of the toothing 20 of the switching ring gear 13 is safely reached when the diameter of the synchronization disk 21 has an appropriate oversize.

The synchronization disk 26 illustrated in FIGS. 7 and 8 has a plane circular disk member with a concentric inner circumference 36. The entire edge of the synchronization disk centers the switching ring gear 13 and accelerates it by friction during the switching process. The outer diameter of this synchronization disk 26 is minimally smaller than the tip circle of the inner circumferential toothing 20 of the switching ring gear 13. In this way, the synchronization disk acts indirectly, i.e., through the second planet wheels 10, onto the switching ring gear 13.

The synchronization disk 28 illustrated in FIGS. 10 and 11 is provided with an angled edge 29 which provides a centering action when pushing on the toothing of the switching ring gear 13. By friction that results through this centering action, the switching ring gear 13 is accelerated. An optimal behavior is achieved for a bending angle α of the edge 29 relative to the plane of the disk 28 of approximately 160 degrees.

While specific embodiments of the invention have been shown and described in detail to illustrate the inventive principles, it will be understood that the invention may be embodied otherwise without departing from such principles.

What is claimed is:

1. A switchable planetary gearbox for a hand-held power tool, the planetary gearbox comprising:
   a planetary carrier;
   a rotatable sleeve having a sun wheel toothing and arranged centrally on an end face of the planetary carrier, wherein the rotatable sleeve comprises a radial section having an outer circumferential toothing;
   planet wheels resting against the end face of the planetary carrier and permanently meshing with the sun wheel toothing of the rotatable sleeve, wherein the radial section of the rotatable sleeve is arranged on a side of the planet wheels facing away from the planetary carrier and projects radially past the planet wheels, wherein the radial section is positioned directly adjacent to the planet wheels and the radial section and the planet wheels delimit a gap;
   a switching ring gear surrounding the planet wheels and having an inner circumferential toothing permanently meshing with the planet wheels, wherein the switching ring gear is axially moveable on the planet wheels from a first end position into a second end position for switching a transmission stage of the planetary gearbox, wherein in the second end position the switching ring gear engages the outer circumferential toothing of the radial section;
   a synchronization disk positioned in the gap delimited by the planet wheels and the radial section, wherein the synchronization disk is connected to the rotatable sleeve so as to rotate with the rotatable sleeve;
   wherein the synchronization disk acts directly or indirectly by friction on the switching ring gear when the switching ring gear is moved from the first end position into the second end position; and
   wherein the synchronization disk has an outer circumference provided with several displaceable contact sections.

2. The planetary gearbox according to claim 1, wherein the synchronization disk extends at least approximately into the area of the outer circumferential toothing.

3. The planetary gearbox according to claim 2, wherein the synchronization disk has a diameter matching approximately a diameter of a tip circle of the inner circumferential toothing of the switching ring gear.

4. The planetary gearbox according to claim 1, wherein the synchronization disk has an inner circumference with at least one radial nose, wherein the at least one radial nose engages the sun wheel toothing of the rotatable sleeve.

5. The planetary gearbox according to claim 4, wherein several of the at least one radial nose are provided and are spaced from one another at a rotary angle spacing that is matched to a pitch of the sun wheel toothing.

6. The planetary gearbox according to claim 1, wherein the contact sections are comprised of contact jaws and spring arms, wherein the spring arms are springy within a plane of the synchronization disk and the contact jaws are connected radial outwardly to the spring arms.

7. The planetary gearbox according to claim 6, wherein the spring arms are created by cutouts in the synchronization disk.

8. The planetary gearbox according to claim 1, wherein the synchronization disk has a thickness of less than 2 mm.

9. The planetary gearbox according to claim 8, wherein the synchronization disk has a thickness of 0.5 mm.

10. The planetary gearbox according to claim 1, wherein the radial section is a planetary carrier of an axially aligned second gear stage of the planetary gearbox.

11. The planetary gearbox according to claim 1, wherein the synchronization disk has a diameter that is minimally oversized relative to a diameter of a tip circle of the inner circumferential toothing of the switching ring gear.

* * * * *